(12) United States Patent
Cassidy et al.

(10) Patent No.: US 8,318,085 B2
(45) Date of Patent: Nov. 27, 2012

(54) METHODS AND COMPOSITIONS FOR INHIBITING METAL CORROSION

(75) Inventors: Juanita M. Cassidy, Duncan, OK (US); Keith A. Frost, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 13/275,466

(22) Filed: Oct. 18, 2011

(65) Prior Publication Data

US 2012/0035086 A1 Feb. 9, 2012

Related U.S. Application Data

(62) Division of application No. 12/622,290, filed on Nov. 19, 2009, now Pat. No. 8,062,586, which is a division of application No. 10/727,003, filed on Dec. 3, 2003, now abandoned.

(51) Int. Cl.
*C23F 11/00* (2006.01)

(52) U.S. Cl. .................. 422/7; 507/90; 507/268; 422/12
(58) Field of Classification Search ................ 422/7, 12; 166/902; 252/390; 507/90, 268
See application file for complete search history.

(56) References Cited

U.S. PATENT DOCUMENTS 4,871,848 A * 10/1989 Treybig et al. ................ 544/224
* cited by examiner

*Primary Examiner* — Sean E Conley
(74) *Attorney, Agent, or Firm* — Robert A. Kent; McDermott Will & Emery LLP

(57) ABSTRACT

Methods of inhibiting the corrosion of a metal surface contacted by an aqueous acid solution. The methods combine a corrosion inhibiting composition with the aqueous acid solution, wherein the corrosion inhibiting composition comprises a reaction product of an alpha,beta-unsaturated ketone with a primary or secondary amine. The metal surface is then contacted with the aqueous acid solution comprising the corrosion inhibiting composition, thereby inhibiting corrosion thereon.

19 Claims, No Drawings

METHODS AND COMPOSITIONS FOR INHIBITING METAL CORROSION

CROSS-REFERENCE TO RELATED APPLICATIONS

This application is a divisional of U.S. patent application Ser. No. 12/622,290 filed on Nov 19, 2009, entitled "Methods and Compositions for Inhibiting Metal Corrosion," and published as US 2010/0087340 by Juanita Cassidy, et al., which was itself a divisional of U.S. patent application Ser. No. U.S. patent application Ser. No. 10/727,003 entitled "Methods and Compositions for Inhibiting Metal Corrosion," filed on Dec. 3, 2003 and published as US2005/0123437 by Cassidy et al., now abandoned.

This application is a divisional application of U.S. patent application Ser. No. 10/727,003 entitled "Methods and Compositions For Inhibiting Metal Corrosion," filed on Dec. 3, 2003 by Cassidy et al., the entirety of which is herein incorporated by reference for all purposes.

BACKGROUND OF THE INVENTION

1. Field of the Invention

The present invention relates to methods of inhibiting the corrosion of metal surfaces by aqueous acids and corrosion inhibiting compositions therefor.

2. Description of the Prior Art

Subterranean hydrocarbon containing formations penetrated by well bores are often treated with aqueous acids to stimulate the production of hydrocarbons therefrom. One such treatment generally referred to as "acidizing" involves the introduction of an aqueous acid solution into a subterranean formation under pressure so that the acid solution flows through the pore spaces of the formation. The acid reacts with acid soluble materials contained in the formation thereby increasing the size of the pore spaces and increasing the permeability of the formation. Another production stimulation treatment known as "fracture-acidizing" involves the formation of one or more fractures in the formation and the introduction of an aqueous acid solution into the fractures to etch the fracture faces whereby channels are formed therein when the fractures close. The acid also enlarges the pore spaces in the fracture faces and in the formation.

Acidizing and fracture-acidizing solutions typically contain, for example, 15% to 28% hydrochloric acid which causes corrosion of metal surfaces in pumps, tubular goods and equipment used to introduce the aqueous acid solutions into the subterranean formations to be treated. The expense associated with repairing or replacing corrosion damaged tubular goods and equipment can be very high. The corrosion of tubular goods and down-hole equipment is increased by the elevated temperatures encountered in deep formations, and the corrosion results in at least the partial neutralization of the acid before it reacts with acid-soluble materials in the formations.

Aqueous acid solutions are also utilized in a variety of other industrial applications to contact and react with acid soluble materials. In such applications, metal surfaces are necessarily also contacted with the acid and any corrosion of the metal surfaces is highly undesirable. In addition, other corrosive fluids such as aqueous alkaline solutions, heavy brines, petroleum streams containing acidic materials and the like are commonly transported through and corrode metal surfaces in tubular goods, pipelines and pumping equipment.

A variety of metal corrosion inhibiting additives have been developed for aqueous acid fluids; however, many of them are considered environmentally objectionable. Cinnamaldehyde which has favorable environmental characteristics has been used for years in corrosion inhibitor formulations; however, the cinnamaldehyde molecule by itself provides only limited inhibition in 15% hydrochloric acid at temperatures greater than 225° F. and in 28% hydrochloric acid at temperatures greater than 200° F. Since cinnamaldehyde is one of the more ecologically benign organic materials in acid corrosion inhibiting compositions, improvements in cinnamaldehyde-based chemistry are actively pursued.

Some improvements have been made to the corrosion inhibiting properties of cinnamaldehyde by combining it with quaternary aromatic amine salts along with acid soluble antimony or bismuth to achieve improved corrosion inhibition of high chromium steel. Other efforts have concentrated on high density brines to which an aldehyde, a primary amine and a thiocyanate salt are added.

There remains a continuing need for improved methods and metal corrosion inhibiting compositions which are effective when combined with aqueous acids, especially at elevated temperatures.

SUMMARY OF THE INVENTION

The present invention provides improved methods and compositions for inhibiting the corrosion of metal surfaces by aqueous acid solutions. When added to aqueous acid solutions, the corrosion inhibiting compositions of this invention inhibit the corrosion of metal surfaces contacted by the aqueous acid solutions at high temperatures. Thus, the methods and compositions of this invention meet the needs described above and overcome the deficiencies of the prior art.

The methods of this invention for inhibiting the corrosion of metal surfaces by an aqueous acid solution basically comprise the steps of combining a corrosion inhibiting composition with the aqueous acid solution. The corrosion inhibiting composition comprises the reaction product of an alpha,beta-unsaturated aldehyde or ketone with a primary or secondary amine. Thereafter, the metal surfaces are contacted with the aqueous acid solution containing the reaction products.

The reaction product can be formulated before combining it with the aqueous acid solution, or the aldehyde or ketone and amine can be added directly to the water used in forming the aqueous acid solution and allowed to react therein to form the corrosion inhibiting composition.

The corrosion inhibiting compositions of this invention basically comprise the reaction product of an alpha,beta-unsaturated aldehyde or ketone with a primary or secondary amine.

Metal corrosion inhibited aqueous acid compositions are also provided by this invention which basically comprise water, an acid and the reaction product of an alpha,beta-unsaturated aldehyde or ketone with a primary or secondary amine. Suitable acids that can be used include hydrochloric acid, acetic acid, formic acid, hydrofluoric acid and mixtures thereof.

DESCRIPTION OF PREFERRED EMBODIMENTS

The methods of this invention for inhibiting the corrosion of metal surfaces by an aqueous acid solution basically comprise the steps of combining a corrosion inhibiting composition with the aqueous acid solution and then contacting the metal surfaces with the aqueous acid solution containing the corrosion inhibiting composition. The corrosion inhibiting composition comprises the reaction product of an alpha,beta-unsaturated aldehyde or ketone with a primary or secondary amine. The corrosion inhibiting composition can be formulated before combining it with the aqueous acid solution, or the alpha,beta-unsaturated aldehyde or ketone and the primary or secondary amine can be added directly to the water used in forming the aqueous acid solution and allowing them to react therein to form the corrosion inhibiting composition.

The metals that can be protected from corrosion by the corrosion inhibiting methods and compositions of this invention include, but are not limited to, steel grade N-80, J-55 P-110, QT800, HS80, and other common oil field alloys such as 13Cr, 25Cr, Incoloy 825 and 316 L.

Examples of suitable alpha,beta-unsaturated aldehydes and mixtures thereof that can be utilized in accordance with the present invention include, but are not limited to: crotonaldehyde, 2-hexenal, 2-heptenal, 2-octenal, 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral; 1-formyl-[2-(2-methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde, o-methylsulfate, p-thiocyanocinnamaldehyde, p-(S-acetyl)thiocinnamaldehyde, p-(S—N, N-dimethylcarbamoylthio)cinnamaldehyde, p-chlorocinnamaldehyde, 5-phenyl-2,4-pentadienal, 7-phenyl-2,4,6-heptatrienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde; 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α(hydroxymethylene)-4-methylbenzylacetaldehyde, 4-chloro-α(hydroxymethylene)benzeneacetaldehyde, α-nonylidenebenzeneacetaldehyde, 3,7-dimethyl-2,6-octadienal, and the like.

Examples of suitable alpha,beta-unsaturated ketones that can be utilized include, but are not limited to: 4-phenyl-3-buten-2-one, 3-methyl-1-phenyl-2-buten-1-one; 4-phenyl-3-penten-2-one; 5-phenyl-4-penten-3-one; 6-phenyl-5-hexen-4-one; 7-phenyl-6-hepten-4-one-2-ol; 7-phenyl-6-hepten-4-one; 1,3-diphenyl-2-propen-1-one; 1,3-diphenyl-2-buten-1-one; dicinnamalacetone; 1,7-bis(4-hydroxy-3-methoxyphenyl)-1,6-heptadiene-3,5-dione, mesityl oxide; phorone; isophorone; 3-methyl-2-cyclohexen-1-one; 3,6-dimethyl-2,6-cycloheptadien-1-one; 5-methyl-4-hexen-3-one, and the like.

Also, beta-hydroxy aldehydes and ketones which dehydrate to give alpha,beta-unsaturated aldehydes and ketones under acidic conditions can be used.

Suitable primary or secondary amines include, but are not limited to, ethanolamine, diethanolamine, partially ethoxylated dehydroabietylamine, ethylamine, diethylamine, dehydroabietylamine, propylamine, dipropylamine, propanolamine, isopropanolamine, 2-propanol-1-amine, diisopropanolamine, butylamine, dibutylamine, tert-butylamine, pentylamine, dipentylamine and tert-benzyl-tert-butylamine. Preferably, the amine is ethanolamine or diethanolamine and more preferably the amine is ethanolamine.

The molar ratio of the primary or secondary amine to the alpha,beta-unsaturated aldehyde or ketone is in the range of from about 0.1:1 to about 4:1, and more preferably from about 1:1 to about 4:1.

The reaction of a primary or secondary amine with an alpha,beta-unsaturated aldehyde or ketone yields aldehyde or ketone imines and hemiaminals, and iminium ions of the amine. The general reaction to form imines, hemiaminals and iminium ions is given below:

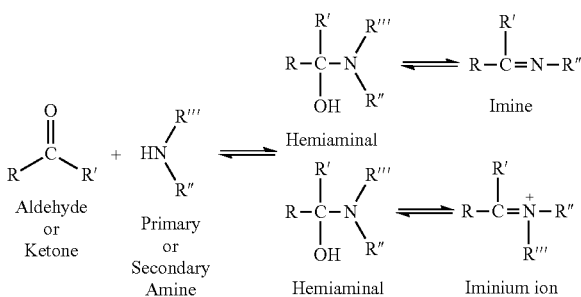

The corrosion inhibiting composition can also include an iodide source such as potassium iodide, sodium iodide, and iodine, solvents such as methanol, isopropanol, 2-ethyl-1-hexanol, ethylene glycol, propylene glycol, diethylene glycol and surfactants such as linear alcohol ethoxylates, amine alcohol ethoxylates, and ethoxylated amides.

Preferably, the corrosion inhibiting composition is combined with the aqueous acid solution in an amount in the range of from about 0.01% to about 5% by volume of the aqueous acid solution, and more preferably from about 0.1% to about 3%.

As mentioned, the acids in the aqueous acid solutions in which the corrosion inhibiting methods and compositions of this invention are particularly effective include, but are not limited to, hydrochloric acid, acetic acid, formic acid, hydrofluoric acid, and mixtures of the acids. Preferably, the aqueous acid solution comprises an acid or mixture of acids in an amount up to about 32% by weight thereof. More preferably, the acid is hydrochloric acid present in the aqueous acid solution in an amount in the range of from about 5% to about 28% by weight thereof.

In practice, corrosion rates generally tend to increase with increasing acid concentration and with increasing temperature. While aldehydes and ketones provide only limited corrosion protection in 15% hydrochloric acid at temperatures higher than 225° F., and in 28% hydrochloric acid at temperatures higher than 200° F., the reaction products of alpha,beta-unsaturated aldehydes or ketones including cinnamaldehyde with primary or secondary amines provide significantly improved corrosion inhibition of metal surfaces under the above mentioned conditions. Generally, the corrosion inhibiting compositions of this invention are effective at hydrochloric acid concentrations of 15% up to about 300° F. and at hydrochloric acid concentrations of 28% up to about 275° F.

As also mentioned, the corrosion inhibiting composition of this invention can also include a surfactant for dispersing the aldehyde in a corrosive aqueous fluid. Examples of suitable such dispersing surfactants are alkyoxylated fatty acids, alkylphenol alkoxylates, ethoxylated amides and ethoxylated alkyl amines. When a dispersing surfactant of the type described above is utilized in a corrosion inhibiting composition of this invention, it is generally present in the composition in an amount in the range of from about 1% to about 45% by weight of the composition.

Another component which can be included in the corrosion inhibiting compositions is a solvent for the aldehyde oligomers which also dissolves in water, referred to herein as a "mutual solvent." Examples of such solvents are methyl alcohol, ethyl alcohol, isopropyl alcohol, ethylene glycol, propylene glycol, dimethyl formamide, N-methylpyrrolidone, propylene glycol methyl ether and butyl cellosolve. When a mutual solvent of the type described above is included in a corrosion inhibiting composition of this invention, it is generally present in an amount in the range of from about 1% to about 40% by weight of the composition.

In addition, the corrosion inhibiting compositions can include one or more quaternary ammonium compounds, one or more corrosion inhibitor activators and other components commonly utilized in corrosion inhibiting formulations such as acetylenic alcohols, Mannich condensation products formed by reacting an aldehyde, a carbonyl containing compound and a nitrogen containing compound, unsaturated carbonyl compounds, unsaturated ether compounds, formamide, formic acid, formates, other sources of carbonyl, iodides, terpenes, and aromatic hydrocarbons.

The quaternary ammonium compounds which function as corrosion inhibitors and can be utilized in accordance with the present invention have the general formula:

$$(R)_4N^+X^-$$

wherein each R is the same or a different group selected from long chain alkyl groups, cycloalkyl groups, aryl groups or heterocyclic groups, and X is an anion such as a halide. The term "long chain" is used herein to mean hydrocarbon groups having in the range of from about 12 to about 20 carbon atoms. Examples of quaternary ammonium compounds which can be included in the corrosion inhibiting compositions of this invention are N-alkyl, N-cycloalkyl and N-alkylarylpyridinium halides such as N-cyclohexylpyridinium bromide or chloride, N-alkyl, N-cycloalkyl and N-alkylarylquinolinium halides such as N-dodecylquinolinium bromide or chloride, and the like. When a quaternary ammonium compound is included in a composition of this invention, it is generally present in an amount in the range of from about 1% to about 45% by weight of the composition.

Corrosion inhibitor activators function to activate corrosion inhibitor components such as quaternary ammonium compounds so that they function as corrosion inhibitors. Examples of such corrosion inhibitor activators which can be utilized are cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing activators such as a mixture of formic acid and potassium iodide. When a corrosion inhibitor activator is included in a composition of this invention, it is generally present in an amount in the range of from about 0.1% to about 5.0% by weight of the composition.

A preferred method of this invention for inhibiting the corrosion of metal surfaces contacted by an aqueous acid solution comprises: (a) combining a corrosion inhibiting composition with the aqueous acid solution, the corrosion inhibiting composition comprising the reaction product of an alpha,beta-unsaturated aldehyde or ketone with a primary or secondary amine; and then (b) contacting the metal surfaces with the aqueous acid solution containing the reaction product.

A preferred composition of this invention for inhibiting the corrosion of metal surfaces by an aqueous acid solution when the composition is added to the aqueous acid solution comprises the reaction product of an alpha,beta-unsaturated aldehyde or ketone with a primary or secondary amine.

A preferred metal corrosion inhibited aqueous acid composition of this invention comprises water; an acid selected from the group consisting of hydrochloric acid, acetic acid, formic acid, hydrofluoric acid and mixtures thereof; and the reaction product of an alpha,beta-unsaturated aldehyde or ketone with a primary or secondary amine.

In order to further illustrate the corrosion inhibiting methods and compositions of the present invention, the following examples are given.

EXAMPLE 1

The corrosion inhibition ability of cinnamaldehyde was compared to that of cinnamaldehyde dehydroabietylimine, the reaction product of cinnamaldehyde and a partially ethoxylated dehydroabietylamine available commercially under the trade name "RAD 1110™" from Hercules Chemical Resins Division, Wilmington, Del. The cinnamaldehyde and ethoxylated dehydroabietylamine were added to and reacted directly in the water used in forming the 15% by weight aqueous solutions of HCl as shown in Table I. The weight loss of N-80 steel was measured after a six-hour exposure to the HCl and inhibitor blend at 225° F. Also shown in Table I are the weight losses of N-80 steel measured after six hour exposures in a 15% by weight aqueous solution of HCl and in a 15% by weight aqueous solution of HCl containing only cinnamaldehyde.

TABLE I

Comparison of Cinnamaldehyde to Cinnamaldehyde Dehydrobietylimine Corrosion Inhibition of N-80 Steel in 15% HCl at 225° F.

| Blend | Corrosion Loss (lb/ft$^2$) |
|---|---|
| 4 mL methyl alcohol, 51.8 mL H$_2$O, 44.2 mL 31.45% HCl | 0.794 |
| 0.48 mL (3.79 × 10$^{-3}$ mol) cinnamaldehyde, 4 mL methyl alcohol, 51.3 mL H$_2$O, 44.2 mL 31.45% HCl | 0.458 |
| 0.48 mL cinnamaldehyde (3.79 × 10$^{-3}$ mol), 4 mL methyl alcohol, 1 mL RAD 1110 ™ (1.4 × 10$^{-3}$ mol), 50.3 mL H$_2$O, 44.2 mL 31.45% HCl | 0.026 |
| 0.48 mL cinnamaldehyde (3.79 × 10$^{-3}$ mol), 4 mL methyl alcohol, 2.8 mL RAD 1110 ™ (4.2 × 10$^{-3}$ mol), 48.5 mL H$_2$O, 44.2 mL 31.45% HCl | 0.047 |

EXAMPLE 2

Amine reaction products of cinnamaldehyde blends were tested for corrosion inhibition of different metals under different conditions. Inhibitor Blend A consisted of 2.5% NaI, 27.75% propylene glycol, 5% 2-ethyl-1-hexanol, 18% mixture of cinnamaldehyde and vinylogated cinnamaldehyde, 7% naphthenic acid ethoxylate [18-20 mols ethoxylate (EO)], 1.75% lauryl alcohol ethoxylate [23 mols EO], and 38% ethanolamine (percents given are weight percents). Blend B consisted of 4.0% NaI, 44.8% propylene glycol, 8.1% 2-ethyl-1-hexanol, 29.0% mixture of cinnamaldehyde, 11.3% naphthenic acid ethoxylate [18-20 mols EO], and 2.8% lauryl alcohol ethoxylate [23 mols EU] (percents given are weight percents). Blend C consisted of 4.0% NaI, 44.8% propylene glycol, 8.1% 2-ethyl-1-hexanol, 29.0% mixture of cinnamaldehyde and vinylogated cinnamaldehyde, 11.3% naphthenic acid ethoxylate [18-20 mols EU], and 2.8% lauryl alcohol ethoxylate [23 mols EU] (percents given are weight percents). Blend D consisted of 2.5% NaI, 27.75% propylene glycol, 5% 2-ethyl-1-hexanol, 18% mixture of cinnamaldehyde and vinylogated cinnamaldehyde, 7% naphthenic acid ethoxylate [18-20 mols EU], 1.75% lauryl alcohol ethoxylate [23 mols EO], and 38% diethanolamine (percents given are weight percents). Blend E consisted of 2.5% NaI, 27.75% propylene glycol, 5% 2-ethyl-1-hexanol, 18% mixture of cinnamaldehyde and vinylogated cinnamaldehyde, 7% naphthenic acid ethoxylate [18-20 mols EU], 1.75% lauryl alcohol ethoxylate [23 mols EU], and 38% triethanolamine (percents given are weight percents). Blend F consists of 3.0% NaI, 33.8% propylene glycol, 6.1% 2-ethyl-1-hexanol, 8.5% naphthenic acid ethoxylate [18-20 mols EO], 2.1% lauryl alcohol ethoxylate [23 mols EU], and 46.3% ethanolamine (percents given are weight percents).

The first test in Table II is a blank test showing the loss of metal for an uninhibited acid under the given conditions. Tests 2-6 demonstrate the superior corrosion inhibiting performance of the cinnamaldehyde/vinylogated cinnamaldehyde imine and cinnamaldehyde/vinylogated cinnamaldehyde hemiaminal of diethanolamine compared to unreacted cinnamaldehyde and unreacted vinylogated cinnamaldehyde. Test 7 shows the higher corrosion losses percent when utilizing the tertiary amine triethanolamine in the blend. The last three tests demonstrate excellent corrosion inhibition of different metals, specifically N-80, 13Cr and 25Cr.

EXAMPLE 3

The next table (Table III) demonstrates cinnamaldehyde reacted with amines, in situ, in 15% HCl at 225° F. containing N—SO steel for 3 hours. The cinnamaldehyde and amine were each added to the test cell along with 4 mL MeOH, followed by the appropriate quantity of water and concentrated HCl to make 100 mL of 15% HCl blend. From Table III, it can be seen that the aldehyde-amine reaction product provides excellent corrosion inhibition.

TABLE III

Summary of Weight Loss Corrosion Testing for Aldehyde/Amine Reaction Products

| Aldehyde (3.78 × 10$^{-3}$ mol) | Amine (3.78 × 10$^{-3}$ mol) | Corrosion Loss (lb/ft$^2$) |
|---|---|---|
| Cinnamaldehyde | — | 0.168 |
| — | Ethylamine | 0.461 |
| — | Diethylamine | 0.307 |
| Cinnamaldehyde | Ethylamine | 0.033 |
| Cinnamaldehyde | Diethylamine | 0.036 |
| — | Ethanolamine | 0.491 |
| — | Diethanolamine | 0.511 |
| Cinnamaldehyde | Ethanolamine | 0.019 |
| Cinnamaldehyde | Diethanolamine | 0.038 |
| Cinnamaldehyde | Triethanolamine | 0.185 |

EXAMPLE 4

The next table (Table IV) demonstrates the ketone/amine reaction of this invention in 15% HCl at 225° F. containing N-80 steel for 3 hours. Each ketone/amine reaction product was made by refluxing the ketone and amine in a 1:1 molar ratio in MeOH for the 4-Phenyl-3-buten-2-one, or acetone for the chalcone, for several hours. The ketone/amine reaction products were each added to the test cell along with 4 mL MeOH, followed by the appropriate quantity of water and concentrated HCl to make 100 mL of 15% HCl blend. From Table IV, it can be seen that the ketone/amine reaction product provides excellent corrosion inhibition.

TABLE II

Summary of Corrosion Inhibition Test Results

| Test No. | Blend | Concentration Used, v/v % | Other Additives | HCl Concentration | Temp ° F. | Time Hrs | Metal | Corrosion Loss (lb/ft$^2$) |
|---|---|---|---|---|---|---|---|---|
| 1 | No Inhibitor | | | | 200 | 5 | J-55 | 1.514 |
| 2 | B | 1.55 | | 28 | 200 | 5 | J-55 | 0.267 |
| 3 | C | 1.55 | | 28 | 200 | 5 | J-55 | 0.705 |
| 4 | F | 2.1 | | 28 | 200 | 5 | J-55 | 0.786 |
| 5 | A | 2.5 | | 28 | 200 | 5 | J-55 | 0.056, 0.067 |
| 6 | D | 2.5 | | 28 | 200 | 5 | J-55 | 0.061 |
| 7 | E | 2.5 | | 28 | 200 | 5 | J-55 | 0.309 |
| 8 | A | 2.5 | | 15 + 2% 88% formic acid | 300 | 2 | N-80 | 0.056 |
| 9 | A | 2.5 | | 28 | 180 | 4 | 13 Cr | 0.028 |
| 10 | A | 2.5 | 0.1% "Losurf400 ™"[1] 0.3% "SGA-11 ™"[2] | 28 | 200 | 6 | 25 Cr | 0.025 |

[1],[2]Halliburton Energy Services chemicals "Losurf 400 ™" is a de-emulsifier and "SGA-II ™" is a friction reducer.

TABLE IV

Summary of Weight Loss Corrosion Testing for Ketone/Amine Reaction Products

| Inhibitor molecule ($3.78 \times 10^{-3}$ mol) | Corrosion Loss (lb/ft$^2$) |
| --- | --- |
| 4-Phenyl-3-buten-2-one | 0.291 |
| 4-Phenyl-3-buten-2-one/ethanolamine | 0.012 |
| 4-Phenyl-3-buten-2-one/diethanolamine | 0.029 |
| 4-Phenyl-3-buten-2-one/triethanolamine | 0.254 |
| Chalcone | 0.519 |
| Chalcone/ethanolamine | 0.009 |
| Chalcone/diethanolamine | 0.015 |

EXAMPLE 5

Table V demonstrates 3,7-dimethyl-2,6-octadienal reacted with ethanolamine and added to 15% HCl at 225° F. containing N-80 steel for 3 hours. The 3,7-dimethyl-2,6-octadienal and amine were each added to the test cell along with 4 mL MeOH, followed by the appropriate quantity of water and concentrated HCl to make 100 mL of 15% HCl blend. From Table V, it can be seen that the aldehyde/amine reaction product provides excellent corrosion inhibition.

TABLE V

Summary of Weight Loss Corrosion Testing for Aldehyde/Amine Reaction Products

| Aldehyde ($3.78 \times 10^{-3}$ mol) | Amine ($3.78 \times 10^{-3}$ mol) | Corrosion Loss (lb/ft$^2$) |
| --- | --- | --- |
| 3,7-dimethyl-2,6-octadienal | — | 0.571 |
| 3,7-dimethyl-2,6-octadienal | ethanolamine | 0.081 |

Thus, the present invention is well adapted to attain the objects and advantages mentioned as well as those that are inherent therein. While numerous changes may be made by those skilled in the art, such changes are encompassed within the spirit of this invention as defined by the appended claims.

What is claimed is:

1. A method of inhibiting the corrosion of a metal surface contacted by an aqueous acid solution comprising:
   (a) combining a corrosion inhibiting composition with the aqueous acid solution, the corrosion inhibiting composition consisting essentially of a reaction product of an alpha,beta-unsaturated ketone with a primary or secondary amine; and then
   (b) contacting the metal surface with the aqueous acid solution comprising the corrosion inhibiting composition.

2. The method of claim 1 wherein the ketone and the primary or secondary amine are separately added to water used to form the aqueous acid solution wherein the ketone and the primary or secondary amine react and form the reaction product therein.

3. The method of claim 1 wherein the alpha,beta-unsaturated ketone comprises at least one ketone selected from the group consisting of: 4-phenyl-3-buten-2-one, 3-methyl-1-phenyl-2-buten-1-one, 4-phenyl-3-penten-2-one, 5-phenyl-4-penten-3-one, 6-phenyl-5-hexen-4-one, 7-phenyl-6-hepten-4-one-2-ol, 7-phenyl-6-hepten-4-one, 1,3-diphenyl-2-propen-1-one, 1,3-diphenyl-2-buten-1-one, dicinnamalacetone, 1,7-bis(4-hydroxy-3-methoxyphenyl)-1,6-heptadiene-3,5-dione, mesityl oxide, phorone, isophorone, 3-methyl-2-cyclohexen-1-one, 3,6-dimethyl-2,6-cycloheptadien-1-one, 5-methyl-4-hexen-3-one, and a beta-hydroxy ketone which dehydrates to form an alpha,beta-unsaturated ketone under acidic conditions.

4. The method of claim 1 wherein the primary or secondary amine comprises at least one amine selected from the group consisting of: ethanolamine, diethanolamine, a partially ethoxylated dehydroabietylamine, ethylamine, diethylamine, dehydroabietylamine, propylamine, dipropylamine, propanolamine, isopropanolamine, 2-propanol-1-amine, diisopropanolamine, butylamine, dibutylamine, tert-butylamine, pentylamine, dipentylamine, and tert-benzyl-tert-butylamine.

5. The method of claim 1 wherein the reaction product results from a reaction of the primary or secondary amine with the alpha,beta-unsaturated ketone at a molar ratio of amine to ketone in the range of from about 0.1:1 to about 4:1.

6. The method of claim 1 wherein the corrosion inhibiting composition is combined with the aqueous acid solution in an amount in the range of from about 0.01% to about 5% by weight of the aqueous acid fluid.

7. The method of claim 1 wherein the corrosion inhibiting composition further comprises at least one corrosion inhibiting composition selected from the group consisting of an iodide source, a solvent, and a surfactant.

8. The method of claim 1 wherein the aqueous solution comprises water and at least one acid selected from the group consisting of: hydrochloric acid, acetic acid, formic acid, and hydrofluoric acid.

9. The method of claim 1 wherein the aqueous acid solution comprises water and hydrochloric acid, the hydrochloric acid being present in an amount in the range of from about 5% to about 28% by weight of aqueous acid fluid.

10. The method of claim 1 which further comprises contacting the metal surface with the aqueous acid solution at temperatures up to about 300° F. when the aqueous acid solution comprises hydrochloric acid at a concentration of about 15% by weight thereof.

11. The method of claim 1 which further comprises contacting the metal surfaces with the aqueous acid flush at temperatures up to about 275° F. when the aqueous acid solution comprises hydrochloric acid at a concentration of about 28% by weight thereof.

12. The method of claim 1 which further comprises contacting the metal surface with the aqueous acid solution at temperatures up to about 300° F. when the aqueous acid solution comprises hydrochloric acid at a concentration of from about 15% to about 28% by weight thereof.

13. The method of claim 1 wherein the corrosion inhibiting composition further comprises at least one component selected from the group consisting of a quaternary ammonium compound; a corrosion inhibitor activator; an acetylenic alcohol; an unsaturated ether compound; formamide; formic acid; a formate; another source of carbonyl; an iodide, a terpene, and an aromatic hydrocarbon.

14. The method of claim 13, the quaternary ammonium compound having the formula:

$(R)_4N^+X^-$ wherein R comprises at least one group selected from the group consisting of: a long chain alkyl group; a cycloalkyl group; an aryl group; and a heterocyclic group, and wherein X is an anion.

15. The method of claim 13 wherein the quaternary ammonium compound comprises at least one compound selected from the group consisting of: an N-alkylpyridinium halide, an N-cycloalkylpyridinium halide, an N-alkylarylpyridinium halide, an N-alkylquinolinium halide, N-cycloalkylquinolinium halide, and an N-alkylarylquinolinium halide.

16. The method of claim 13 wherein the quaternary ammonium compound is present in the corrosion inhibiting composition in an amount in the range of from about 1% to about 45% by weight of the corrosion inhibiting composition.

17. The method of claim 13 wherein the corrosion inhibitor activator comprises at least one activator selected from the group consisting of: cuprous iodide, cuprous chloride, an antimony compound, an antimony oxide, an antimony halide, antimony tartrate, antimony citrate, an alkali metal salt of antimony tartrate, an alkalai metal salt of antimony citrate, an alkali metal salt of pyroantimonate, an antimony adduct of ethylene glycol; a bismuth compound, a bismuth oxide, a bismuth halide, bismuth tartrate, bismuth citrate, an alkali metal salt of bismuth tartrate, an alkali metal salt of bismuth citrate, iodine, an iodide compound, and formic acid.

18. The method of claim 13 wherein the corrosion inhibitor activator is present in the corrosion inhibition composition in an amount in the range of from about 0.1% to about 5.0% by weight of the composition.

19. A method comprising:
introducing an aqueous acid solution comprising a corrosion inhibiting composition into at least a portion of a subterranean formation, wherein the corrosion inhibiting composition consists essentially of a reaction product of an alpha,beta-unsaturated ketone with a primary or secondary amine, and wherein the alpha,beta-unsaturated ketone comprises at least one ketone selected from the group consisting of: 4-phenyl-3-buten-2-one, 3-methyl-1-phenyl-2-buten-1-one, 4-phenyl-3-penten-2-one, 5-phenyl-4-penten-3-one, 6-phenyl-5-hexen-4-one, 7-phenyl-6-hepten-4-one-2-ol, 7-phenyl-6-hepten-4-one, 1,3-diphenyl-2-propen-1-one, 1,3-diphenyl-2-buten-1-one, dicinnamalacetone, 1,7-bis(4-hydroxy-3-methoxyphenyl)-1,6-heptadiene-3,5-dione, mesityl oxide, phorone, isophorone, 3-methyl-2-cyclohexen-1-one, 3,6-dimethyl-2,6-cycloheptadien-1-one, 5-methyl-4-hexen-3-one, and a beta-hydroxy ketone which dehydrates to form an alpha,beta-unsaturated ketone under acidic conditions.

* * * * *